Oct. 24, 1933.   J. H. ROETHEL   1,931,738
WINDOW REGULATOR
Filed Nov. 18, 1931
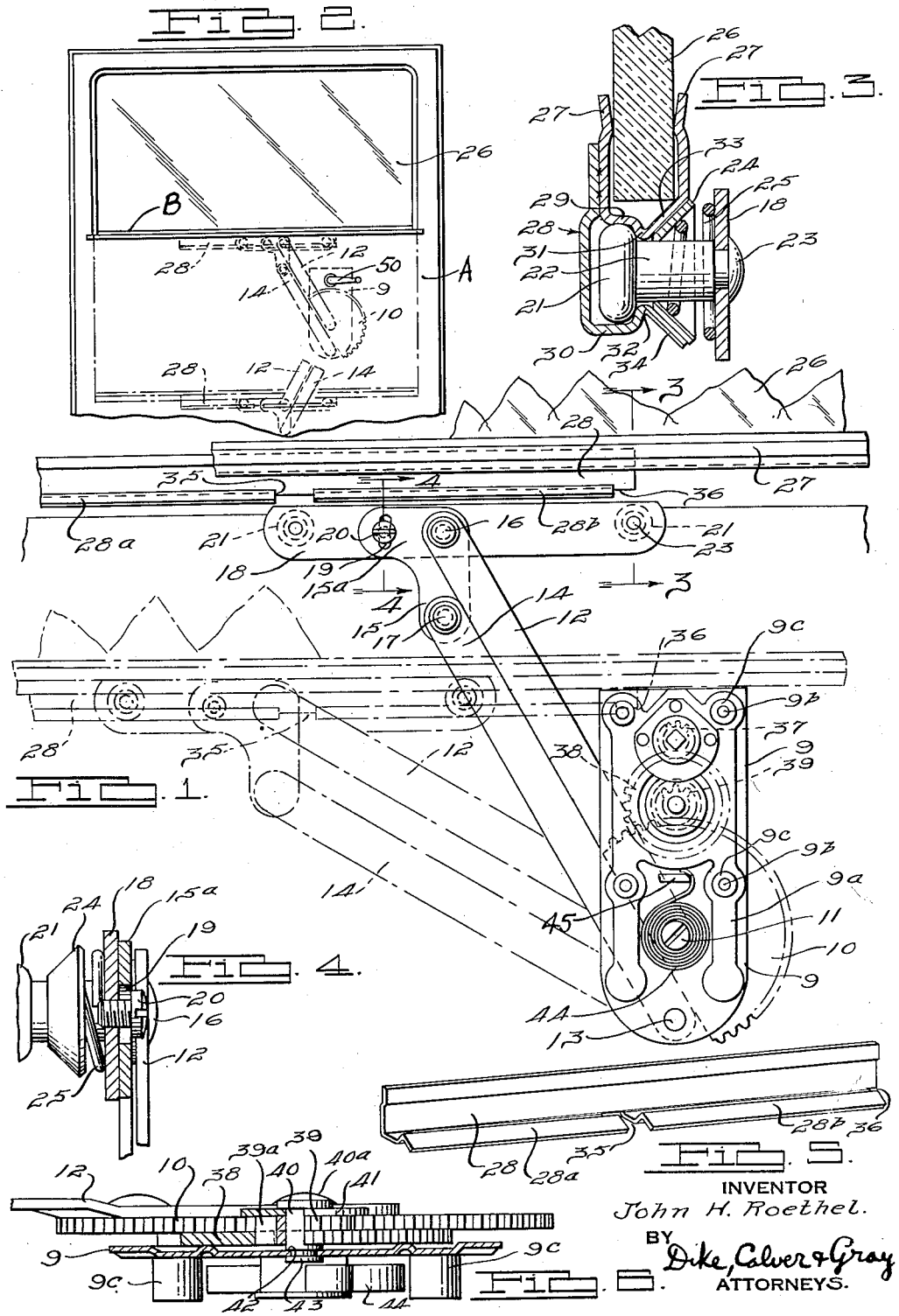
INVENTOR
John H. Roethel.
BY
Dike, Calver & Gray
ATTORNEYS.

Patented Oct. 24, 1933

1,931,738

UNITED STATES PATENT OFFICE 1,931,738

WINDOW REGULATOR

John H. Roethel, Detroit, Mich.

Application November 18, 1931
Serial No. 575,863

23 Claims. (Cl. 268—126)

REISSUED

This invention relates to regulators or controlling mechanisms for windows, particularly for use in motor vehicles or the like, an object of the invention being to provide improved means of relatively simple, economical and durable construction for elevating and lowering the glass.

A further object of the invention is to provide an improved window regulator or mechanism especially adapted for installation, for instance, in the body or door of an automobile, and in which the mechanism is provided with improved associated parts carried respectively by the body or door and the window glass which may be readily and easily assembled in production.

A further object of the invention is to provide an improved window regulating mechanism of the type embodying a pair of swinging or oscillating arms and associated parts and wherein improved means is provided for attaching the mechanism to the window glass to facilitate assembly of the parts, the construction being especially effective to maintain the glass in true vertical position, particularly where used in connection with windows in which the glass has a slanting edge and is not guided at opposite upright edges thereof.

Other objects of this invention will appear in the following description and appended claims, reference being had to the accompanying drawing forming a part of this specification wherein like reference characters designate corresponding parts in the several views.

Fig. 1 is a side elevation illustrating a window regulating mechanism embodying the invention, the full line position showing the parts preparatory to assembly with a window glass and the dotted line position illustrating an operating position of the associated parts.

Fig. 2 is a fragmentary view illustrating a door or body portion of an automobile having a regulator, in accordance with the present invention, installed therein.

Fig. 3 is a section taken substantially on line 3—3 of Fig. 1 in the direction of the arrows.

Fig. 4 is a section taken substantially on line 4—4 of Fig. 1 in the direction of the arrows.

Fig. 5 is a perspective view of the channel structure which is carried at the lower edge of the window glass.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing, wherein one embodiment of the invention is illustrated by way of example, the apparatus includes a supporting plate 9 which is preferably embossed at 9a for reinforcement and is provided with suitable screw bosses 9c having holes 9b by means of which the plate may be secured, for example, within the body or door A of an automobile. The invention, however, is not limited to a support of this design or form.

Secured to a rotatable stud 11 carried by the support 9 is a gear segment 10 having peripheral teeth, as illustrated, which is operated by means of reduction gearing and through the medium of releasable locking mechanism by a crank handle 50, as hereinafter described.

Secured to the face of the gear segment 10 is a swinging or oscillating arm or bar 12. Extending parallel to this arm and pivoted at 13 to the supporting plate 9 is a second arm or bar 14. In the present case the bars 12 and 14 are preferably of substantially the same length, the pivot 13 being shown as vertically spaced below the axis of swinging 11 of the bar 12. A member 15 is provided for connecting the ends of the parallel arms 12 and 14, this member having a vertical portion and preferably an offset horizontal portion 15a. The arm 12 is directly pivoted at its outer end 16 to the member 15 and the arm 14 in turn is pivoted at 17 to the lower end of the member 15. As shown in the present instance the pivots 16 and 17 are located one above the other and are spaced apart a distance equal to the distance of spacing of the pivots 11 and 13.

The connecting means at the outer free ends of the arms 12 and 14 includes in the present instance a pair of relatively adjustable members 15 and 18, which after adjustment may be clamped together in fixed relative position. The member 18 comprises a bar which, depending upon its adjustment, preferably extends in substantially horizontal position. The bar 18 is pivoted by means of the pivot 16 to the member 15. To connect the parts together in adjusted position the offset portion 15a has an arcuate slot 19, the pivot 16 constituting the center of curvature thereof. Extending through this slot and into a tapped hole in the bar 18 is a set screw 20. It will be readily understood that by loosening the screw 20 the bar 18 may be turned about the pivot 16 so as to vary its angular position slightly with respect to the horizontal, and then by tightening the screw 20 the parts 15 and 18 will be rigidly clamped together. In the present case the bar structure 15, 18 is slidingly connected to a window glass channel structure and this connection is obtained through the medium of a pair of horizontally spaced buttons or rolls 21, each having a shank 22 which is riveted at 23 to the bar portion 18. Mounted on the cylindrical shank 22 is a cone shaped washer 24 and between this washer and the bar 18 is interposed a compression spring 25. The window glass 26 is supported at the bottom by means of an improved channel or glass retainer structure which comprises in the present instance a channel 27 having spring walls which confine the lower edge of the glass. Secured along one face of this channel, as by means of spot welding, is plate 28 forming a depending wall and which is constructed to provide with the member 27 guideways for the buttons 21 and at the same time a means whereby these buttons may be simultaneously inserted into the guideways at predetermined points in its length. Opposed inner faces of the members 27 and 28 are formed with horizontal portions 29 and 30 engaging opposite sides of the buttons 21 and providing parallel substantially horizontal guide surfaces for sliding movement of these buttons during the operation of the regulator. Adjoining the parallel portions 29 and 30 the channel members are provided with inwardly extending flanges or ridges 31 and 32 which overlap the buttons 21 and form therebetween longitudinal constricted openings of less height than the diameter of the buttons 18, these longitudinal alined openings approximating in height the diameter of the shanks 22 and providing longitudinal guideways therefor. The channel members 27 and 28 are also formed with reversely tapered or inclined portions 33 and 34 respectively corresponding to the conical shape of the washers 24, the buttons 21 being held in the guideways against chattering or vibration by the tension of the springs 25.

In the present embodiment the member 28 is constructed to permit assembly of the buttons or headed devices 21 into the guideways preferably by relatively moving the window glass and regulator operating mechanism in substantially a vertical direction or in a direction parallel or nearly parallel to the plane of the glass. This is accomplished in the present instance by providing a pair of openings or notches 35 and 36 through the bottom of the member 28, each opening extending through the parts 30, 32 and 34 as illustrated in Figs. 1 and 5. These openings or notches are of a size to permit movement of the buttons 21 into the channelways, and in order that the parts may be thus assembled it is important that the distance between the openings 35 and 36 be no greater than the distance between the buttons 21. In other words, the openings 35 and 36 are at least spaced apart sufficiently to correspond to the horizontal spacing of the buttons 21.

In the production of automobile bodies it is often desirable to first install and attach the operating mechanism, including the supporting plate 9, within the body or door of the automobile and thereafter install the glass and attach the glass to the regulator mechanism. Ordinarily the sill B of the window has a narrow horizontal opening for the vertical passage of the glass, when lowered, into the space within the outer and inner panels of the body. Consequently, considerable difficulty is often encountered in assembling the glass, which carries the channel structure at the lower edge thereof, with the operating mechanism of the regulator owing to the restricted space in the window reveal for manipulating the glass so as to connect it with the operating mechanism mounted within the body below the window reveal. The present preferred construction provides a means whereby the horizontally spaced buttons 21 may be assembled within the ways of the channel member 28 as by a simple vertical movement of the glass into position to permit the buttons to be inserted through the notches or openings 35 and 36 directly into the ways. To accomplish this assembly the regulator mechanism is first adjusted to the highest position of the bar 18, as shown in Fig. 2. The method of assembly is illustrated in full lines in Fig. 1, the glass being placed within the window reveal at a slight angle and then lowered vertically in a direction nearly in the plane of the glass so as to cause the buttons to enter the ways. The regulator is then operated to lower the glass sufficiently to clear the upper edge of the window reveal at which point the glass can then be set into the window opening. Thereafter, during operation the button 21 at the left in Fig. 1 will travel in the guideway formed by the channel portion 28a and the button 21 at the right in Fig. 1 will travel in the channelway formed by the channel portion 28b. Although in the present instance the member 28 is shown as a single member, it will be understood that two separate channels may be provided which are separated by an opening corresponding to the opening 35, separate guide ways being provided in either instance for the spaced buttons 21 and spaced openings to permit assembly of the buttons and channel members 28a and 28b as by moving them together in approximately a vertical direction.

It is frequently found in production that the channel member or members carried at the lower edge of the glass are inaccurately mounted so as to extend at a slight angle to the horizontal as a result of which the buttons 21 will not extend in a plane exactly parallel to the plane of the guideway. Where there is such variation in the relative horizontal positions of the bar 18 and channel 28, it is possible to correct this by making a slight adjustment in the relative positions of the devices 21. This is preferably accomplished by adjusting the angular position of the bar 18 as above described, thus permitting the buttons 21 to travel true in the guideways without binding.

The gear 10 is in the present instance operated through reduction gearing from a pinion 37 adapted to be operated by the hand crank 50. This pinion meshes with a larger gear 38 attached to a small gear 39 which in turn meshes with the gear segment 10.

A suitable spiral spring 44 is provided for counter-balancing purposes, this spring having one end anchored to the stud 11 and the other end fastened at 45 to a projecting portion of the supporting plate 9. It will also be understood that suitable locking mechanism (not shown) is also provided between the pinion 37 and its shaft for releasably maintaining the regulator mechanism and hence the window glass in any adjusted position.

I claim:

1. In a window regulator, the combination of a swinging bar, a second bar pivoted to said swinging bar, a fixed support, means interconnecting the second bar and support for maintaining said second bar in constant angular position, a channel structure mounted at the lower edge of a window glass and having substantially horizontal guide ways, and laterally spaced devices carried by said second bar and insertable substantially vertically into said guide ways for interlocking the second bar and channel member together.

2. In a window regulator, the combination of a swinging bar, a member pivoted to said swinging bar, a fixed support, means interconnecting said member and support for maintaining said member in constant angular position, laterally spaced devices carried by said member for supporting the window glass at spaced points, and means for interconnecting said devices and window glass to permit relative movement thereof, said means being constructed to permit assembly of said devices therewith by relative movement of the window glass and devices in substantially the vertical plane of the glass.

3. In a window regulator, the combination of a swinging bar, a second bar pivoted to said swinging bar, a fixed support, means interconnecting the second bar and support for maintaining said second bar at a constant angle to the horizontal, a channel structure mounted at the lower edge of a window glass and having substantially horizontal guide ways, laterally spaced devices carried by said second bar and insertable substantially vertically into said guide ways for interlocking the second bar and channel member together, and means for varying the relative positions of said devices and channel structure.

4. In a window regulator, the combination of a swinging bar, a member pivoted to said swinging bar, a fixed support, means interconnecting said member and support for maintaining said member in constant angular position, laterally spaced devices carried by said member for supporting the window glass at spaced points, and means for relatively adjusting the positions of said devices.

5. In a window regulator the combinatioin of a swinging bar, a second bar pivoted to said swinging bar, a fixed support, a swinging arm interconnecting the second bar and support for maintaining the second bar in constant angular position, means for supporting a window glass and having longitudinal guide ways with openings at one side adjacent said second bar, the latter having laterally spaced devices fitting into said guide ways, and means for relatively adjusting said devices to aline them with said guideways.

6. In a window regulator the combination of a fixed support, a pair of parallel swinging arms pivoted on the support, a member pivotally connected to said arms and held thereby in constant angular position, a window glass supporting structure having channel ways, laterally spaced devices carried by said member fitting into said ways and held against withdrawal during normal operation of the regulator, said supporting structure having spaced openings at the bottom of the ways for insertion of said devices into the ways.

7. In a window regulator the combination of a fixed support, a pair of parallel arms pivoted at corresponding ends to said support, a member pivotally connected to the opposite ends of said arms and held thereby in fixed angular position, a structure supporting the lower edge of a window glass and having channel ways, laterally spaced devices on said member and shiftable laterally in said ways, and means whereby said devices are installed in said ways by relatively moving the devices and window glass in a direction substantially parallel to the plane of the glass.

8. In a window regulator the combination of a channel structure connected to the lower edge of a window glass and having longitudinal guide ways provided with longitudinal openings of less height than said guide ways, a horizontal bar, a plurality of annular devices of a diameter substantially equal to the height of the guide ways secured at fixed points in the length of said bar and incapable of being inserted through said openings into the guide ways, a pair of swinging arms pivoted at spaced points to said bar to maintain the bar in substantially horizontal position, means for varying slightly the angular position of said horizontal bar relatively to said channel structure, a fixed support to which said arms are pivoted at correspondingly spaced points whereby said arms will swing in parallel relation to raise or lower the glass, and means whereby said devices are simultaneously insertable into the guide ways.

9. In a window regulator, the combination of a retainer structure secured to the lower edge of a window glass, a laterally movable bar having means connected to said retainer structure for maintaining the same against tilting movement, a pair of swinging arms pivotally connected at adjacent ends to said bar at spaced points, means for pivotally supporting the opposite ends of said arms to cause the same to swing in parallel relation, means connected to one of said arms for swinging the arms in unison, and means to permit assembly of said first means into interlocking position with the retainer structure by relative movement of said bar and window glass in a vertical direction substantially parallel to the plane of the glass.

10. In a window regulator, the combination of a swinging bar, a member pivoted to said swinging bar, a fixed support, means interconnecting said member and support for maintaining said member at a constant angle to the horizontal, means for varying the fixed angular position of said member, projecting means carried by said member for maintaining the window glass in constant angular position, and means for interconnecting said projecting means and window glass to permit relative movement thereof, said last means being constructed to permit assembly of said projecting means therewith by relative movement of the window glass and projecting means in substantially the vertical plane of the glass.

11. In a window regulator the combination of a swinging bar, a second bar pivoted to said swinging bar, a fixed support, a swinging arm interconnecting the second bar and support for maintaining the second bar in constant angular position, supporting means at the lower edge of a window glass, and laterally spaced devices carried by said second bar for connection with said supporting means, the latter having laterally spaced bottom openings corresponding to the spacing of said devices to permit said devices to be simultaneously assembled with said supporting means by relative movement of said devices and window glass in substantially the plane of the latter.

12. In a window regulator the combination of a fixed support, a pair of parallel swinging arms pivoted on said support at corresponding ends, means for swinging said arms, a bar connecting the opposite ends of said arms and having means for connection to a window glass to support the glass in constant angular position, and means for adjusting the relative fixed angular position of said means and glass.

13. In a window regulator, a horizontal bar having spaced devices for supporting a window glass at spaced points, means for shifting said bar horizontally and vertically to raise and lower the window and for maintaining the bar against angular displacement, a retaining member at the lower edge of the glass connected to said devices, said member having means for horizontally guiding said devices, and means whereby said member and devices may be simultaneously connected together by relatively moving the member and devices in a vertical direction.

14. In a window regulator, the combination of a channel structure secured to the lower edge of a window glass, a laterally movable member having horizontally spaced devices, said channel structure having a horizontal guideway or guideways for said devices and having openings at its bottom adapted to aline with said devices to permit simultaneous insertion of said devices thereinto, a pair of swinging arms connected at adjacent ends to said member at spaced points, a support, and means for connecting the opposite ends of said arms to the support thereby to maintain said devices in alinement with said guideway or guideways during movement of the devices along the ways.

15. In a window regulator, a support, a pair of parallel swinging arms pivoted adjacent their inner ends on the support, a bar pivotally interconnecting the outer ends of the arms and maintained by said arms in constant angular position, and a member secured to the lower edge of a window glass, said bar and member having one thereof a longitudinal guideway and the other means adapted to travel in the guideway for maintaining the glass in constant angular position, said bar and member being normally interlocked against withdrawal of said means from the guideway when relatively moved in a direction perpendicular to the plane of the glass, said means being adapted to be withdrawn from the guideway upon relatively moving the glass and bar in substantially a vertical direction.

16. In a window regulator, a support, operating mechanism for a window glass including a pair of parallel swinging arms pivoted on the support adjacent their inner ends, a bar pivoted to the outer ends of the arms and maintained by said arms in constant angular position, a retaining member at the lower edge of the window glass, said bar and member having one thereof a slideway and the other having means normally interlocked with the slideway at opposite sides thereof, said bar and member providing a non-tiltable support for the lower edge of the glass, and means whereby said bar and member are adapted to be assembled by relatively shifting them in a vertical direction.

17. In a window regulator, a support, operating mechanism for a window glass including a pair of parallel swinging arms pivoted on the support adjacent their inner ends, a bar pivoted to the outer ends of the arms, and a retaining member at the lower edge of the glass, said bar and member having one thereof a straight line guideway and the other having means for maintaining the glass against tilting and adapted to travel in the guideway, said bar and retaining member being interlocked along both upper and lower longitudinal sides of the guideway against disconnection of the parts during normal operation, there being an opening or openings in the base of said guideway for insertion of said means into the guideway.

18. In a window regulator, a support, operating mechanism for a window glass including a pair of parallel swinging arms pivoted on the support adjacent their inner ends, a bar pivoted to the outer ends of the arms and maintained by said arms in constant angular position, a retaining member at the lower edge of the glass, means for connecting said bar and retaining member together to maintain the latter in constant angular position, and means for adjusting the relatively fixed angular position of said means and retaining member.

19. In a window regulator mechanism having a pair of swinging arms and horizontally spaced button devices carried thereby for raising and lowering a window glass; a retainer member adapted to be secured to the lower edge of the glass and having a longitudinal channel way or ways for slidably receiving said devices, said ways having longitudinal constricted openings of less height than the vertical height of said devices thereby interlocking said devices at the upper and lower sides thereof against withdrawal through said openings, said retainer member being open through the base of said channel way or ways for the insertion of said devices into the ways by relatively moving the retainer member and devices in substantially a vertical direction.

20. In a window regulator mechanism having a pair of swinging arms and horizontally spaced button devices carried thereby for raising and lowering a window glass; a retainer member adapted to be secured to the lower edge of the glass and having a longitudinal channel way or ways for slidably receiving said devices, said ways having longitudinal constricted openings of less height than the vertical height of said devices thereby interlocking said devices at the upper and lower sides thereof against withdrawal through said openings, said retainer member being open through the base of said channel way or ways for the insertion of said devices into the ways by relatively moving the retainer member and devices in substantially a vertical direction, said retainer member being formed outside said restricted openings with outwardly flared bearing surfaces.

21. In a window regulating mechanism having swinging arms carrying spaced headed studs provided with spring pressed substantially conical washers; a retainer member adapted to be secured to the lower edge of a window glass, said member having a longitudinal channel way or ways for slidingly receiving the heads of said studs, said ways having a constricted neck adapted to project intermediate said heads and the conical washers and effective to interlock the heads against horizontal withdrawal from the channel ways, said retainer member being open through its base for the insertion of said devices vertically into the ways and having outwardly flared portions forming bearing seats for said washers.

22. A glass retainer structure for a two arm window regulator provided with spaced headed devices at the outer ends of the arms, comprising a member adapted to be secured to the lower edge of a window glass and having a depending wall terminating in a flange member extending horizontally therefrom, said members providing the upper and lower longitudinal sides of a channel way or ways for slidingly receiving said devices, said members being formed to provide a longitudinal constricted opening or openings of less height than the diameter of said devices thereby to interlock the devices at opposite sides thereof against horizontal withdrawal from the ways during normal operation, and said flange member being notched in its length to permit insertion of said devices into the channel ways.

23. A glass retainer structure for a two arm window regulator provided with spaced headed devices at the outer ends of the arms, comprising a member adapted to be secured to the lower edge of a window glass and having a depending wall terminating in a flange member extending horizontally therefrom, said members providing the upper and lower longitudinal sides of a channel way or ways for slidingly receiving said devices, said members being formed to provide a longitudinal constricted opening or openings of less height than the diameter of said devices thereby to interlock the devices against horizontal withdrawal from the ways during normal operation, said flange member being notched in its length to permit insertion of said devices into the channel ways, and said members being formed outside said openings with outwardly flared bearing seats.

JOHN H. ROETHEL.